(12) United States Patent
Livingston et al.

(10) Patent No.: US 12,339,140 B2
(45) Date of Patent: Jun. 24, 2025

(54) MAG SENSE TOOL

(71) Applicants: Jimmy Livingston, Manvel, TX (US); Phillip R. Phelps, Fort Worth, TX (US)

(72) Inventors: Jimmy Livingston, Manvel, TX (US); Phillip R. Phelps, Fort Worth, TX (US)

(73) Assignee: OIL STATES ENERGY SERVICES, L.L.C., Houston, TX (US)

( * ) Notice: Subject to any disclaimer, the term of this patent is extended or adjusted under 35 U.S.C. 154(b) by 0 days.

(21) Appl. No.: 17/893,301

(22) Filed: Aug. 23, 2022

(65) Prior Publication Data
US 2024/0068844 A1 Feb. 29, 2024

(51) Int. Cl.
*G01D 5/22* (2006.01)
*G01B 7/00* (2006.01)

(52) U.S. Cl.
CPC ............ *G01D 5/2291* (2013.01); *G01B 7/003* (2013.01)

(58) Field of Classification Search
None
See application file for complete search history.

(56) References Cited

U.S. PATENT DOCUMENTS

| | | | | |
|---|---|---|---|---|
| 5,305,212 A | * | 4/1994 | Kuckes | G01V 3/26 324/346 |
| 2010/0301840 A1 | * | 12/2010 | Filatov | F16C 32/0446 324/207.11 |
| 2017/0081955 A1 | * | 3/2017 | Yu | G01N 27/9006 |
| 2018/0023940 A1 | * | 1/2018 | Madson | G01D 5/2013 324/207.15 |
| 2020/0081148 A1 | * | 3/2020 | Capoglu | E21B 47/00 |
| 2021/0239448 A1 | * | 8/2021 | Toniolo | E21B 47/0025 |

* cited by examiner

*Primary Examiner* — Nasima Monsur
(74) *Attorney, Agent, or Firm* — Morgan, Lewis & Bockius LLP (57) ABSTRACT

A magnetic sensing tool ("MST") uses differentials in induced voltage to detect the approximate location of a ferric target tool within surface pressure control equipment associated with a wellhead. The MST comprises a transmitter coil and two receiver coils configured such that a voltage generated in the transmitter coil induces a baseline voltage, and a baseline voltage differential, in the receiver coils when no target tool is present. A target tool passing axially through the MST will disrupt the magnetic fields inducing the voltages, such that variations in the voltage differential can be used to detect the approximate location of the target tool. The MST can be deployed alone or in series depending on the requirements of detection of the target tool.

9 Claims, 12 Drawing Sheets

MAG SENSE TOOL

BACKGROUND OF THE INVENTION

Technical Field

The present disclosure relates generally to detecting a tool in an annulus space, and more particularly, detecting a target tool that is made of ferric steel material within pressure control equipment by using electromagnetic induction sensors.

Background

The objective was to develop a tool capable of detecting a tool/target, such as a perforating gun or any tool that is made of ferric steel material, that is located within surface Pressure Control Equipment ("PCE"), such as a lubricator or spacer spool.

A wireline is often used to move tools in and out of a wellbore. When PCE is present, it must be opened before wireline tools may be axially moved through the PCE in order to be lowered into, or removed from, the wellbore. Once the wireline tool is through, the PCE must be closed again to perform the function of controlling pressure from the wellbore. One drawback of existing methods of moving wireline tools is the inability of an operator to reliably determine whether a wireline tool is still inside the PCE at the time it is being closed. If the PCE is closed too soon, the wireline tool or other equipment may be damaged, potentially causing not only the loss of the tool but also downtime for the entire operation.

The current solution provides examples of a new Mag Sense Tool ("MST") which is developed to eliminate mishaps that are known to happen when running wireline tools in PCE, ensuring that there is no wireline damage and that tools can still be accessed and properly aligned to their exact locations. Thus, the MST device acts as an insurance policy against a few of the most common potential hazards, including, for example, closing a valve on a tool, closing a tool trap on a tool, and/or hitting a grease head and pulling out of a rope socket, among other potential issues.

Prior art sensors in the oil and gas field may include technologies such as RFID sensors and magnets. However, these tools measure changes in the electrical field generated by the magnets (known as Hall-effect sensors) themselves, as opposed to directly measuring voltage that is disturbed by the target tool as it traverses through the wellbore. Thus, these measurement devices do not have any direct measurements of voltage of the tool.

One such prior art design comes from a tool known generally in the field as a Linear Variable Differential Transformer ("LVDT") tool. These tools include a center transmitter coil that is opposed on either side by a receiver coil. The two receiver coils are connected to an electronics interface in such a manner as to produce a signal that is proportional to the position of the target within the sensing element. Generally, an LVDT tool is typically designed to produce an accurate measurement of the center sensing element when the target device travels along a solid rod. However, these are not typically used in oil and gas measurements because they can only measure the presence of a solid rod.

Further, a typical LVDT device consists of a single centralized transmitter coil with specifically designed receiver coils positioned on either side of the transmitter coil. In a typical LVDT device, the coils are wound and are designed specifically, to accurately measure the movement of the center core of the LVDT device. Prior art LVDT tools suffer from the inability to accurately measure the movement (in unit length) of a target tool.

Thus, an improved sensor is required that can detect accurately the presence of a steel tool of an undetermined length and diameter, and also directly measure voltage for accurate and repeatable detection of the target tool.

In general, an inductive position sensor is used to detect the presence of a metallic device, generally with ferric metal included, as it moves past the sensor. An inductor develops a magnetic field by passing current through its coils that, when an object passes that interacts with the magnetic field, creates a disruption to the magnetic field.

In one example of the current wireline MST device, a target tool to be detected is a wireline tool within a PCE component. In an embodiment, the current design for a magnetic sensor tool may have a short length (L), large diameter (D) coil with an aspect ratio L/D designed to minimize the sensing of a small diameter object (such as a magnetic steel wireline) yet still maintain adequate sensitivity to detect a larger diameter target tool connected to the wireline.

Additionally, this design enables detection of the direction of movement of a target tool within the PCE component, and to some extent, the speed of the target through the sensing elements. In the case of a long target tool string, this design should yield a signal as the top of the tool enters the sensing elements and an additional signal as the bottom of the tool string exits the sensing element. The design will give a unique signal as the mass of magnetic (ferric) metal traverses past the sensor element.

SUMMARY

One or more embodiments of the invention describe a low power wireless magnetic tool detector that can be placed at multiple locations on a PCE string, and capable of sending real-time position telemetry to wellsite personnel, including the pressure control technician and wireline truck operator.

The MST device is a tool that analyzes a relative disruption to a magnetic field created by coils in the MST device that create the magnetic field. Thus, the MST device can be used to detect tools on a wireless or command unit to ensure proper locating of tools. The response signal of the example MST device herein can be used to determine the signal of a target tool and provide a linear and repeatable signal representation of a target tool passing through the MST device which can be attached to a wireline.

Methods can be applied to determine specific types of tools that may be used in embodiments consistent with this disclosure, and set voltages can be applied to determine where tools are within the PCE components. Any number of tools may be used with the embodiments of the MST device described herein and the example embodiments are non-limiting in nature.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The present disclosure relates generally to determining the location of a target tool in an annulus, e.g., a casing string, using embodiments of the currently provided MST tool. As described herein, embodiments of the MST device described herein address the issues described with respect to traditional uses of LVDT tools that cannot effectively determine the location of a tool in a casing string.

Figure 1A:
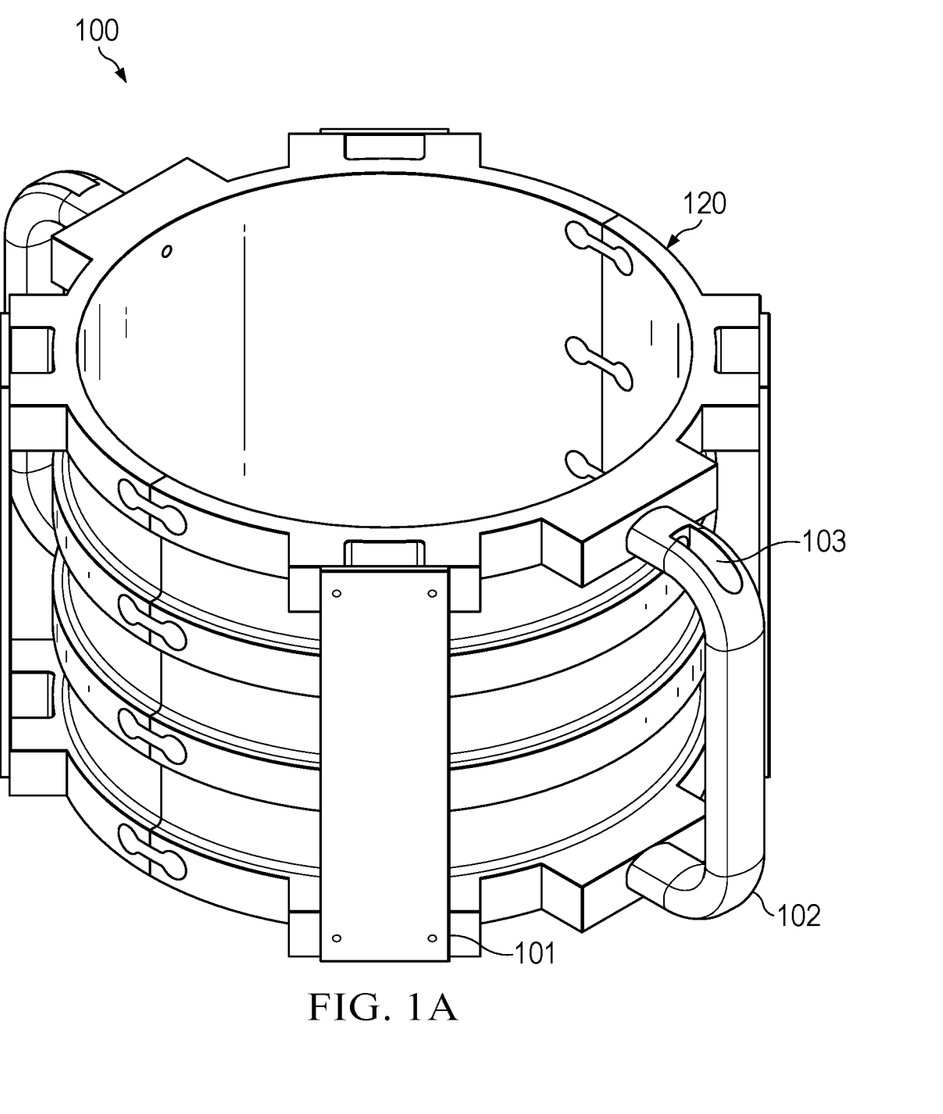
FIGS. 1A-1G are a series of views of an embodiment of the current MST device during the passage of a target tool.
Figure 1B:
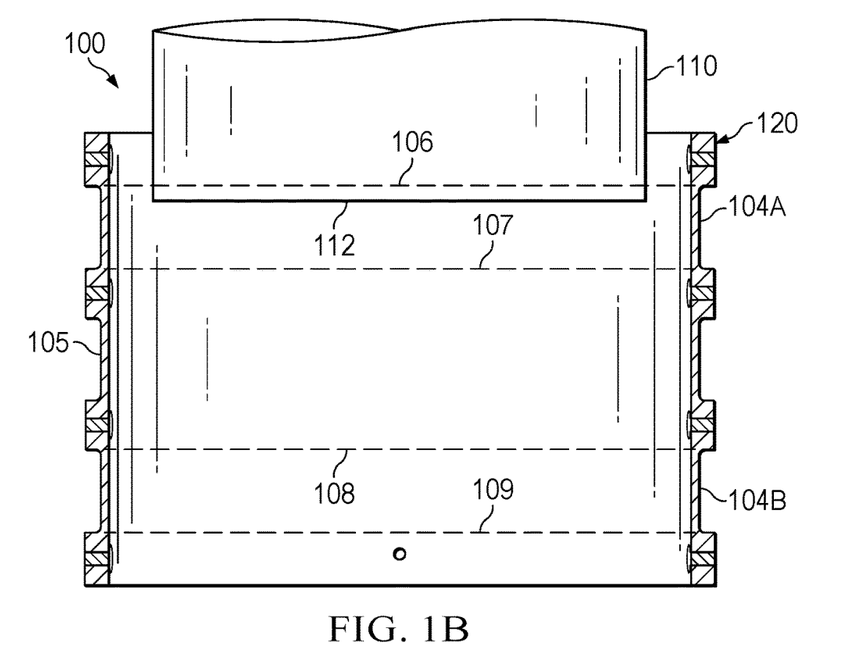
Figure 1C:
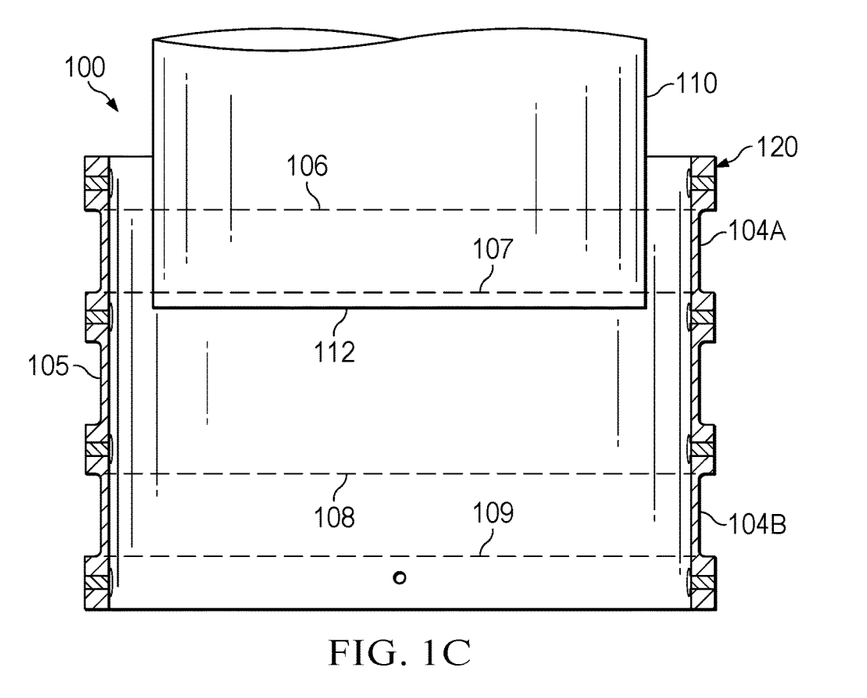

FIGS. 1A-C depict the current MST device, as an example of the disclosed embodiments herein. FIG. 1A depicts an MST device perspective front view. FIG. 1A shows the MST assembly 100 comprising housing 120 with circuit base mounts 101. The handles 102 are for transporting and handling the assembly for installation and can be removed at bolt 103 during and/or after installation.

FIG. 1B shows a cross-sectional side view of MST assembly 100. Disposed around housing 120 are upper receiver coil 104A, central transmitter coil 105, and lower receiver coil 104B.

DC voltage is passed through transmitter coil 105, thereby creating a magnetic field and inducing DC voltage V1 in receiver coils 104A and V2 in receiver coil 104B. Receiver coils 104A and 104B may be designed such that V1 is either greater or less than V2, resulting in voltage differential ΔV. In the embodiment discussed below, V2>V1, but one of ordinary skill in the art will understand that the same principle would apply and the MST assembly would function equally well if V1>V2. If the magnetic field within the MST assembly is undisturbed, the baseline voltages induced in receiver coils 104A and 104B will be $V1_s$ and $V2_s$, resulting in a baseline voltage differential of AVs.

As described in further detail below, the differential ΔV between voltage V1 and voltage V2 may be used to determine the approximate position of a target tool 110 as it passes through MST assembly 100 and disrupts the magnetic field inducing a voltage in receiver coils 104A and 104B.

As shown in FIG. 1B, as leading edge 112 of target tool 110 passes the upper edge 106 of receiver coil 104A, it will begin to disrupt the magnetic field associated with receiver coil 104A, and voltage V1 will accordingly begin to decrease. Because V2>V1, ΔV will begin to increase.

As shown in FIG. 1C, as leading edge 112 of target tool 110 passes the lower edge 107 of receiver coil 104A, voltage V1 will drop to its minimum value $V1_{min}$. At this point, because V2>V1 and the magnetic field inducing voltage in receiver coil 104B remains undisturbed, voltage V2 is unchanged at $V2_s$, and the voltage differential is therefore at its maximum value $ΔV_{max}$.

Figure 1D:
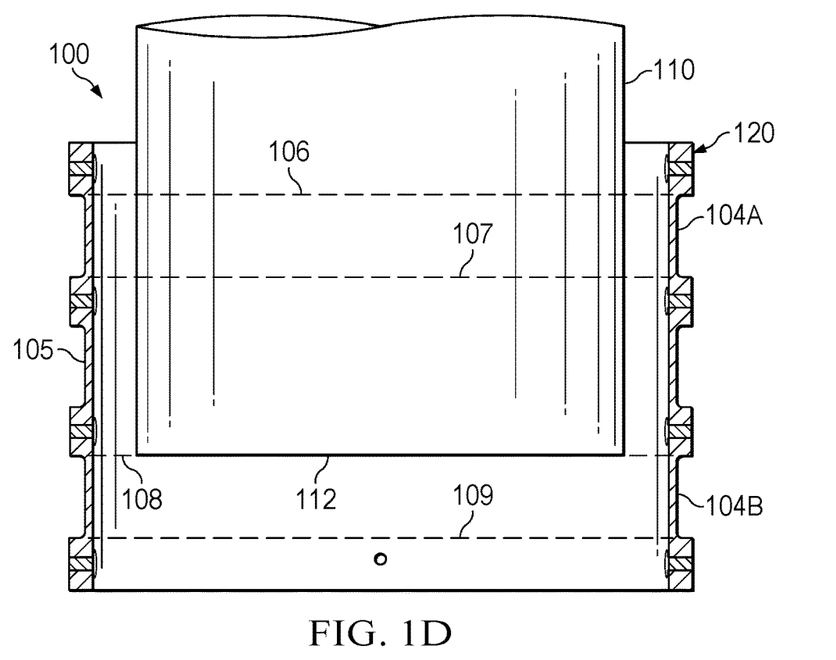

As shown in FIG. 1D, as leading edge 112 of target tool 110 passes the upper edge 108 of receiver coil 104B, it will begin to disrupt the magnetic field associated with receiver coil 104B, and voltage V2 will accordingly begin to decrease from its initial value of $V2_s$. Also, because V2>V1, the voltage differential will begin to decrease from its maximum value $ΔV_{max}$.

Figure 1E:
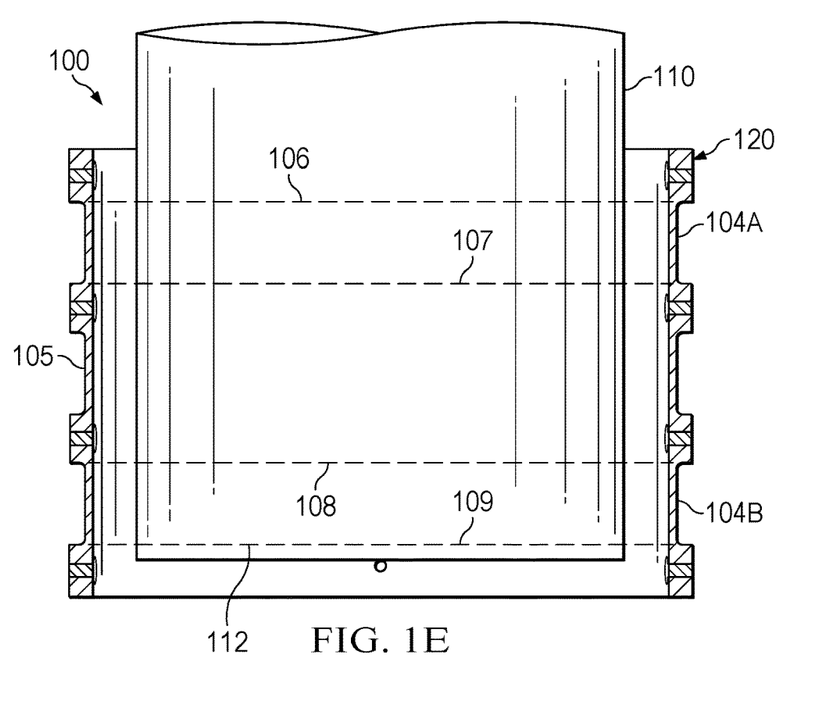

As shown in FIG. 1E, as leading edge 112 of target tool 110 passes the lower edge 109 of receiver coil 104B, voltage V2 will drop to its minimum value $V2_{min}$. At this point, because voltages V1 and V2 have both decreased to their minimum values, voltage differential ΔV will return to its initial value of $ΔV_s$, and it will remain at that value until the trailing edge of target tool 110 enters the MST assembly 100.

Figure 1F:
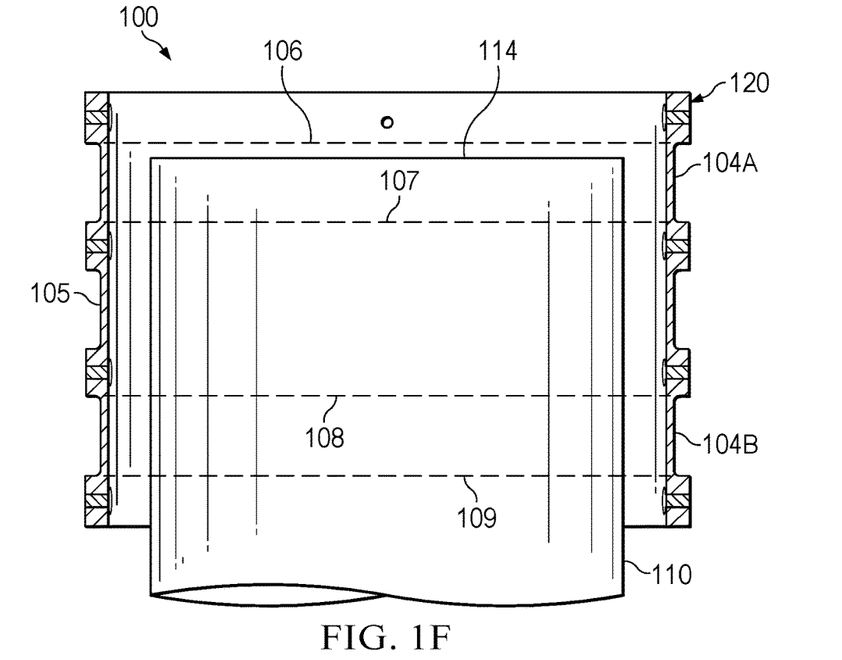

As shown in FIG. 1F, as trailing edge 114 of target tool 110 passes upper edge 106 of receiver coil 104A, a portion of the magnetic field associated with receiver coil 104A will be restored and voltage V1 will accordingly begin to increase from $V1_{min}$. Because $V2_{min}>V1_{min}$, voltage differential ΔV will also begin to decrease from $ΔV_s$.

Figure 1G:
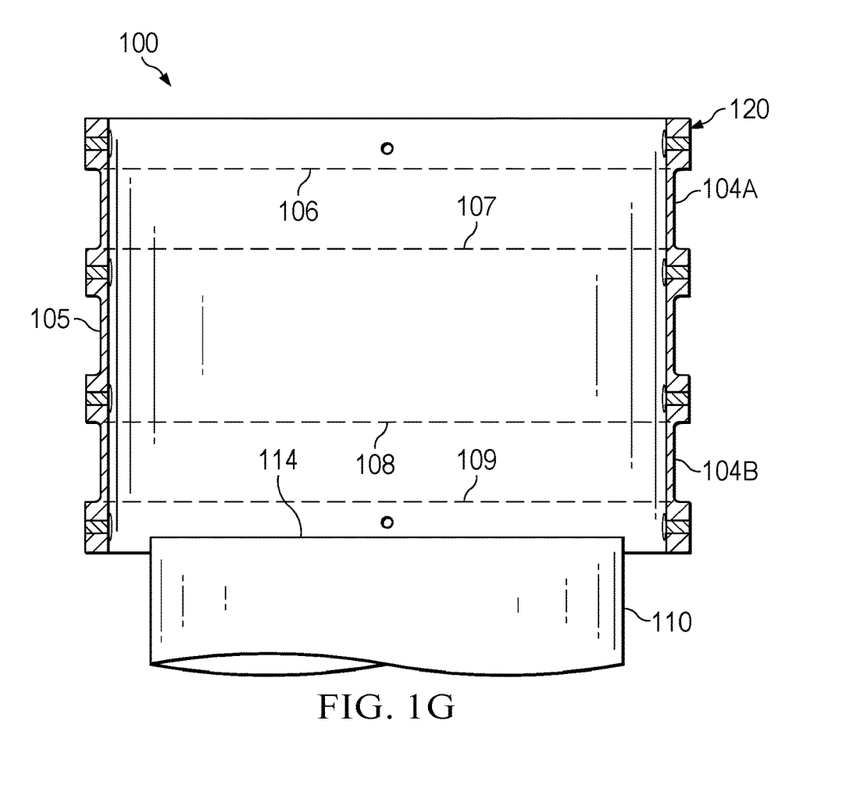

As shown in FIG. 1G, as trailing edge 114 of target tool 110 passes lower edge 109 of receiver coil 104B, both induced voltages will return to their baseline values of $V1_s$ and $V2_s$, resulting in the same baseline voltage differential of $ΔV_s$.

It will be understood by one of ordinary skill in the art that, although the foregoing description applies when target tool 110 is moving axially downward, the same principle would apply and the MST assembly would function equally well if target tool 110 moved in the opposite direction.

Figure 2:
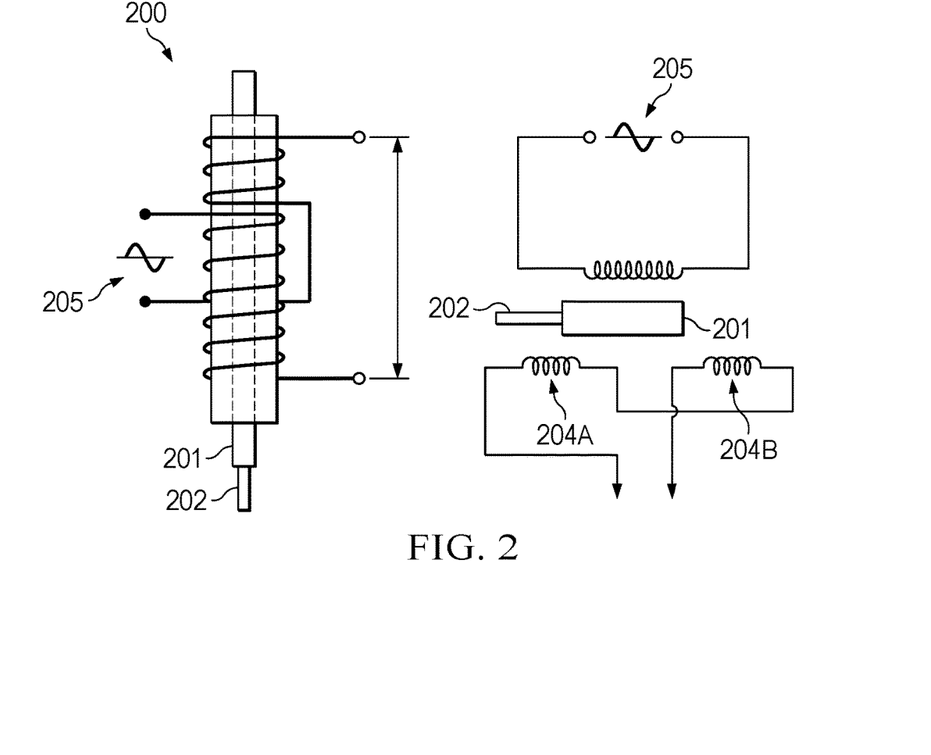
FIG. 2 is an electrical schematic view of an embodiment of the current MST device.

FIG. 2 depicts a diagram of the electrical construction of an example MST device 200. In FIG. 2 there is an example target tool 201 of undetermined length and diameter, which is the device the MST is attempting to detect. The smaller diameter object 202 connected to the target tool 201 may be, for example, a wireline. The central transmitter coil 205 functions to induce voltage in receiver coils 204A and 204B, substantially as described above. The position of the target tool 201 determines the voltage response between transmitter coil 205 and receiver coils 204A and 204B, respectively.

Figure 3:
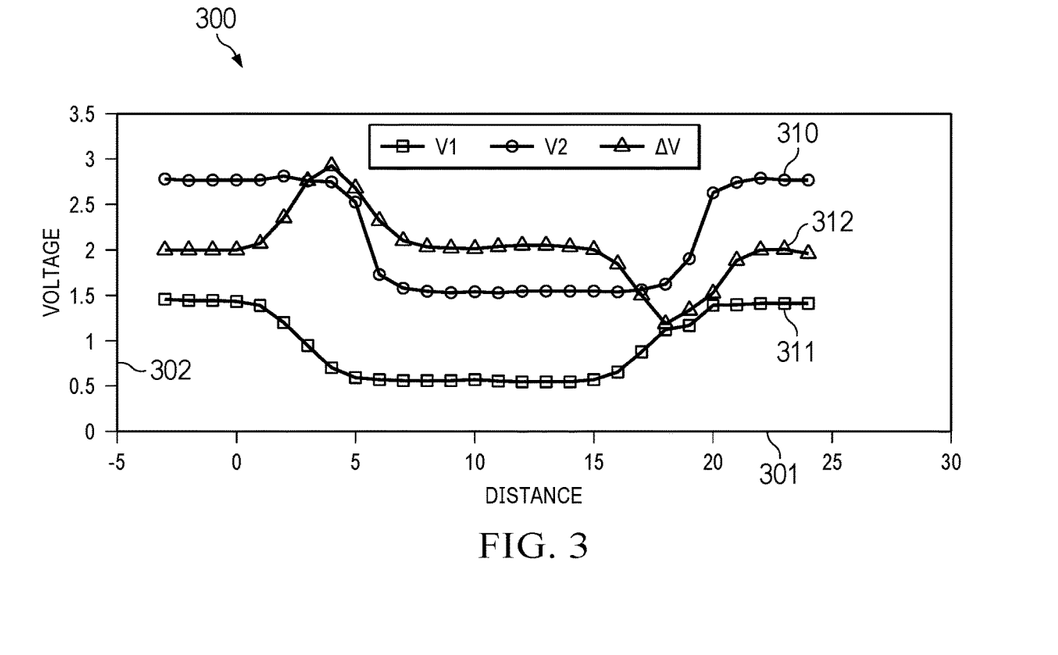
FIG. 3 is a graphical view of a response curve for an example MST device.

FIG. 3 depicts a response curve 300 for the MST device detecting a target tool, for example made of ferric metal, through a coil array of the type disclosed herein. In this example, the distance between receiver coils 104A and 104B is approximately 4 inches and the length of the target tool is approximately 14 inches.

The X axis depicted at 301 shows a one-inch interval data length. The Y axis at 302 represents the rectified DC voltage of the two receiver coils, as depicted for example, in FIG. 1 at 104A and 104B. Curve 311 represents the rectified DC voltage V1 induced in receiver coil 104A. Consistent with the above description, V1 begins to decrease as soon as the target tool enters the MST device, and continues to decrease until reaching $V1_{min}$ when the entire target tool has entered the MST device. The voltage in receiver coil 104A remains at $V1_{min}$ until the trailing edge of the target tool passes the upper edge of receiver coil 104A, at which point V1 begins to increase until returning to its baseline value of $V1_s$.

Curve 310 represents the rectified DC voltage V2 induced in receiver coil 104B. Consistent with the above description, V2 remains at $V2_s$ until the leading edge of the target tool reaches the upper edge of receiver coil 104B, at which point it begins to decrease until reaching $V2_{min}$. The voltage in receiver coil 104B remains at $V2_{min}$ until the trailing edge of the target tool passes the upper edge of receiver coil 104B, at which point V2 begins to increase until returning to its baseline value of $V2_s$.

Curve 312 represents the voltage differential ΔV between V1 and V2. Consistent with the above description, because V2>V1, ΔV increases during the period that V1 is decreasing while V2 remains unchanged. After V2 has decreased to $V2_{min}$, ΔV returns to $ΔV_s$ and remains at that level until V1 begins to increase after the trailing edge of the target tool has passed the upper edge of receiver coil 104A. At that point, ΔV begins to decrease until it reaches $ΔV_{min}$ when the trailing edge of the target tool has passed the lower edge of receiver coil 104A but not yet reached receiver coil 104B. Finally, once the trailing edge of the target tool reaches the upper edge of receiver coil 104B, ΔV begins to increase again until it returns to the baseline voltage differential of $ΔV_s$ when the target tool has passed completely through the MST device.

Figure 4:
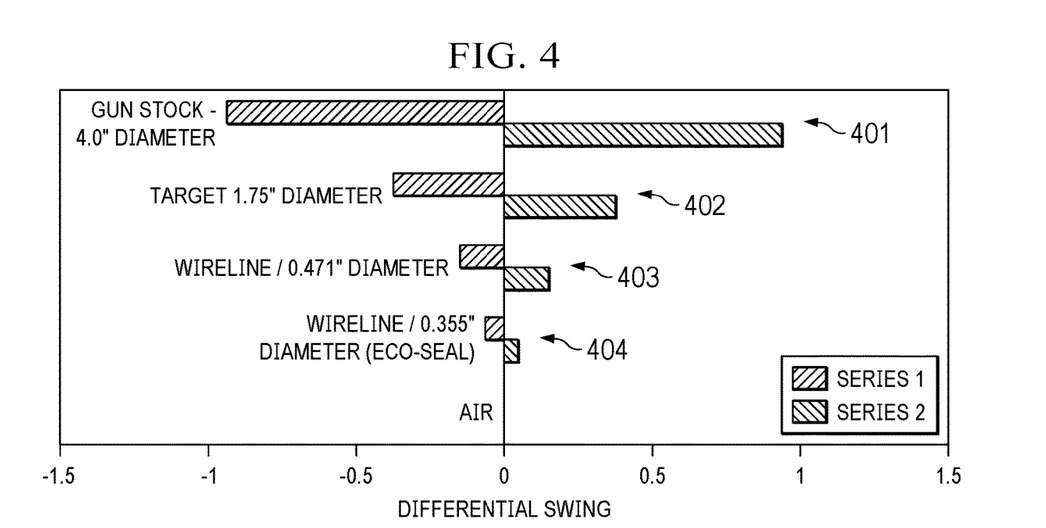
FIG. 4 is a depiction of the differential between two different series in an MST tool.

FIG. 4 depicts the voltage response from different diameter target tools 401-404 when entering and exiting the MST device. As can be seen, in the left most series, as a tool enters the upper receiver coil, the response curve shows a greater negative response, and when exiting the MST device the response curve is equal but opposite voltage. Thus, the voltages can be normalized across the traverse of the MST tool to account for the voltage response coming into and going out of the MST tool to ensure proper alignment and/or installation.

Figure 5:
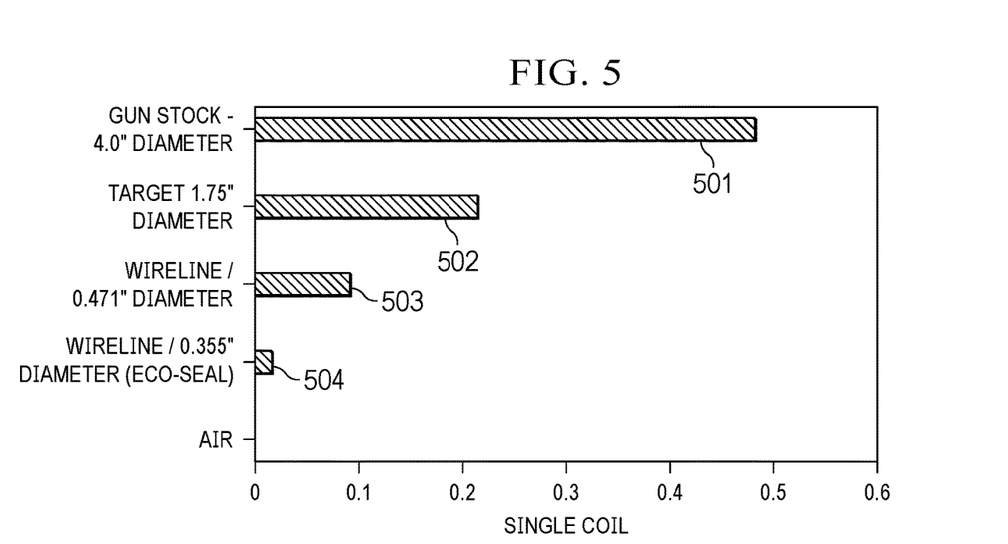
FIG. 5 is a depiction of a single coil MST tool's response to different diameter target tools.

FIG. 5 depicts the single coil response curves from target tools 501-504 based on various diameter target tools. For example, a target tool gun stock 501 of diameter 4" will provide a different MST response voltage than a smaller target tool, for example, a target tool 502 of 1.75" diameter. The linear response to the diameter can be calibrated by the operator for each respective target tool to be deployed so expected response curves are prepared ahead of installation.

Figure 6:
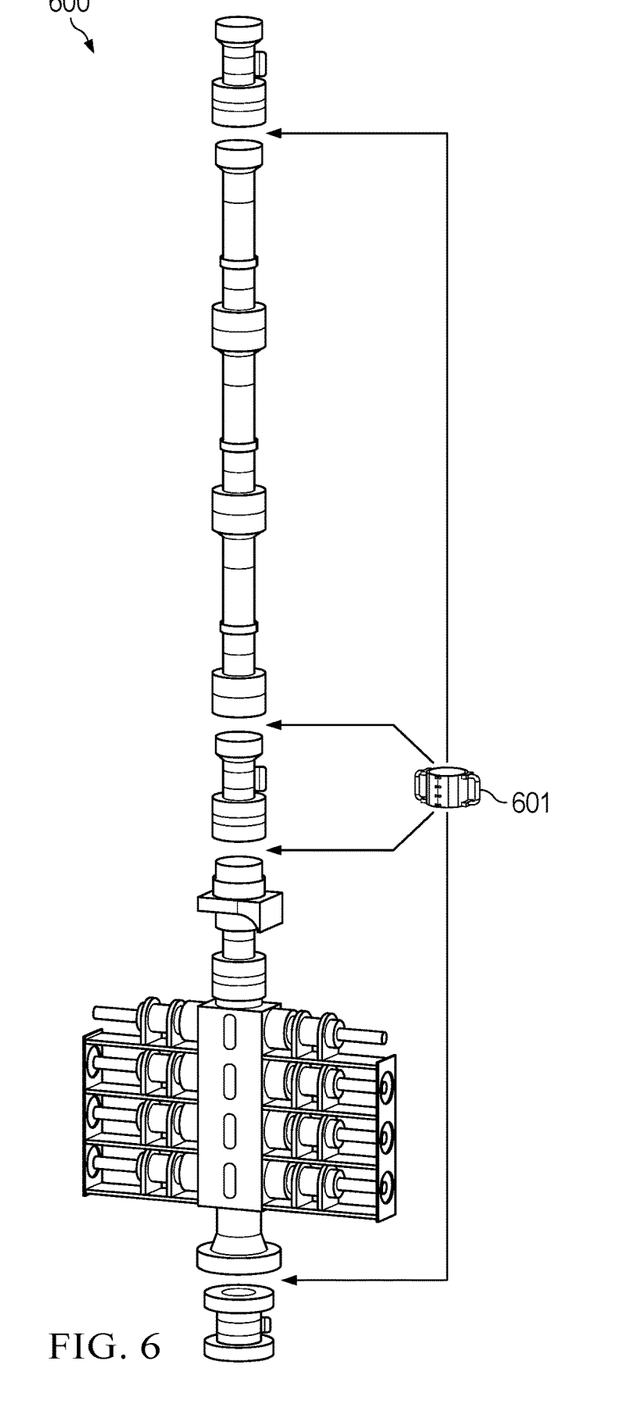
FIG. 6 is an isometric drawing of a pressure control assembly showing potential locations for installation of an example MST tool.

FIG. 6 depicts a layout of a pressure control assembly 600 with potential locations where an MST device(s) 601 may be installed for detection of a target tool.

Figure 7:
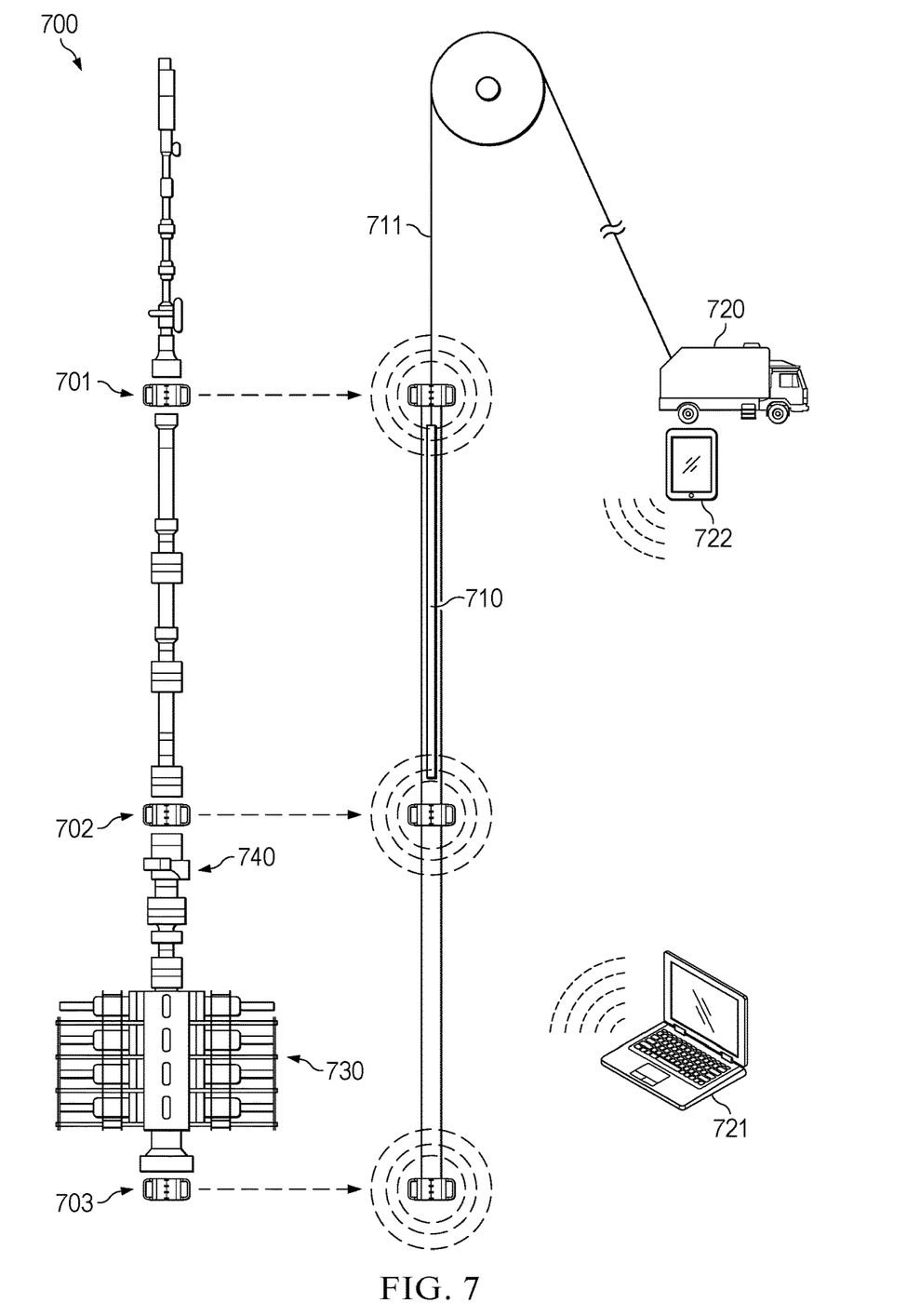
FIG. 7 is a depiction of a layout of an installed MST tool system.

FIG. 7 depicts a layout of an installed MST system at multiple locations on a pressure control assembly 700. For example, an MST device 701 may be installed near the top section of the depicted pressure control assembly 700. MST device 702 may be installed near the middle section of the pressure control assembly 700, above tool trap 740 and wireline BOP valve 730. MST device 703 may be installed near the bottom of the depicted annulus string 700 of the pressure control assembly 700, below BOP 730. Example target tool 710 is depicted as moving within the pressure control assembly 700 via wireline 711, and detected by each of the MST devices installed as it traverses from the top to the bottom (or vice versa). An operator may receive the raw data and/or signals on controller 721 or a wireless device 722 to understand where the target tool is within the pressure control assembly 700. Wireline control 720 can adjust its operations based on the relative point within the installed MST devices 701-703 such that the target tool 710 is properly positioned for preferred operations. For example, MST device 702 may detect when BOP 730 may safely be closed because target tool 710 has not yet been lowered to that location. Similarly, once target tool 710 has been lowered into BOP 730, MST device 703 may detect when BOP 730 may again safely be closed because target tool 710 has completely exited.

Figure 8A:
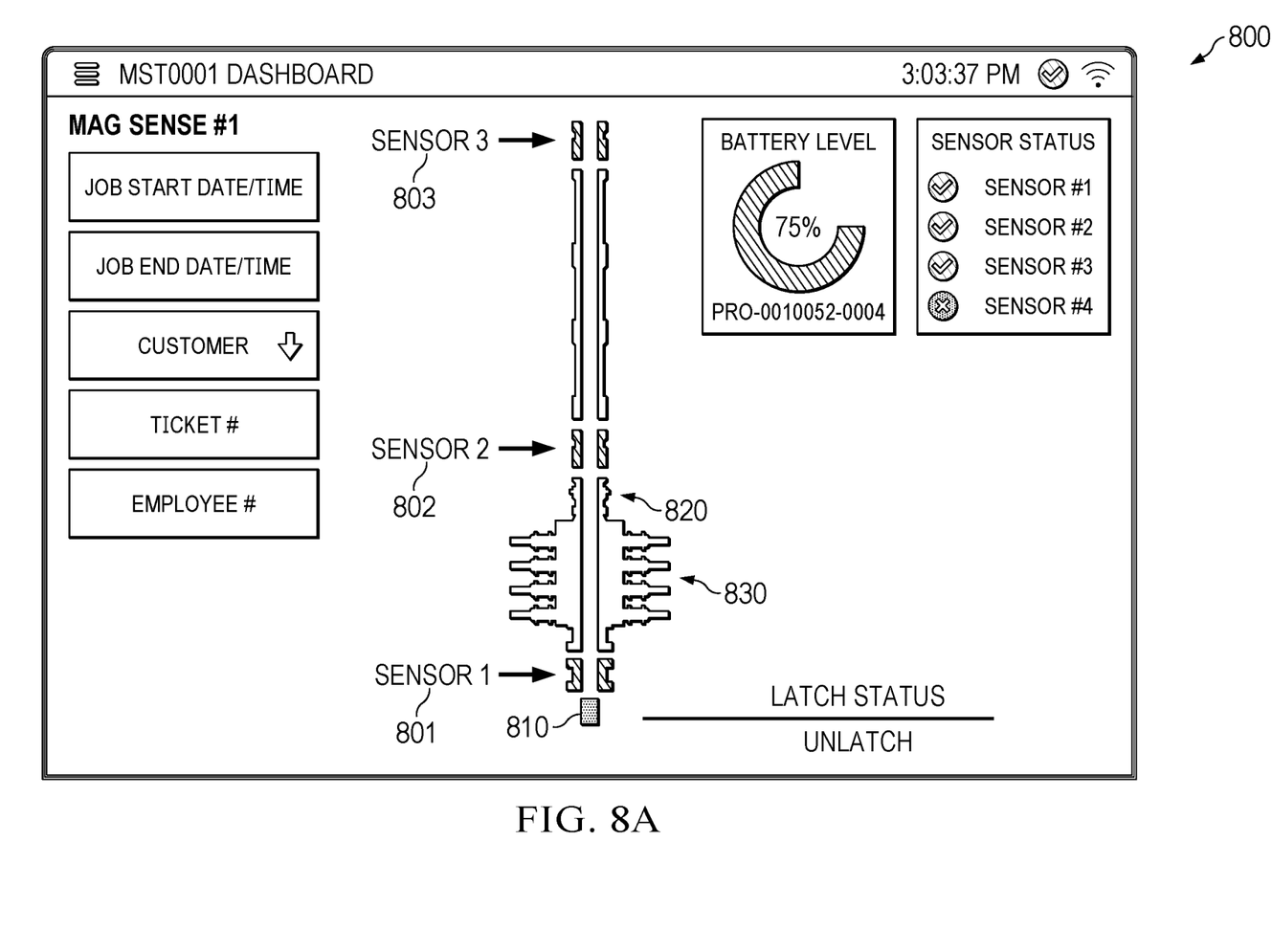
FIGS. 8A-D is a series of depictions of the MST control system with various tools, tool lengths, and tool numbers for operations.
Figure 8B:
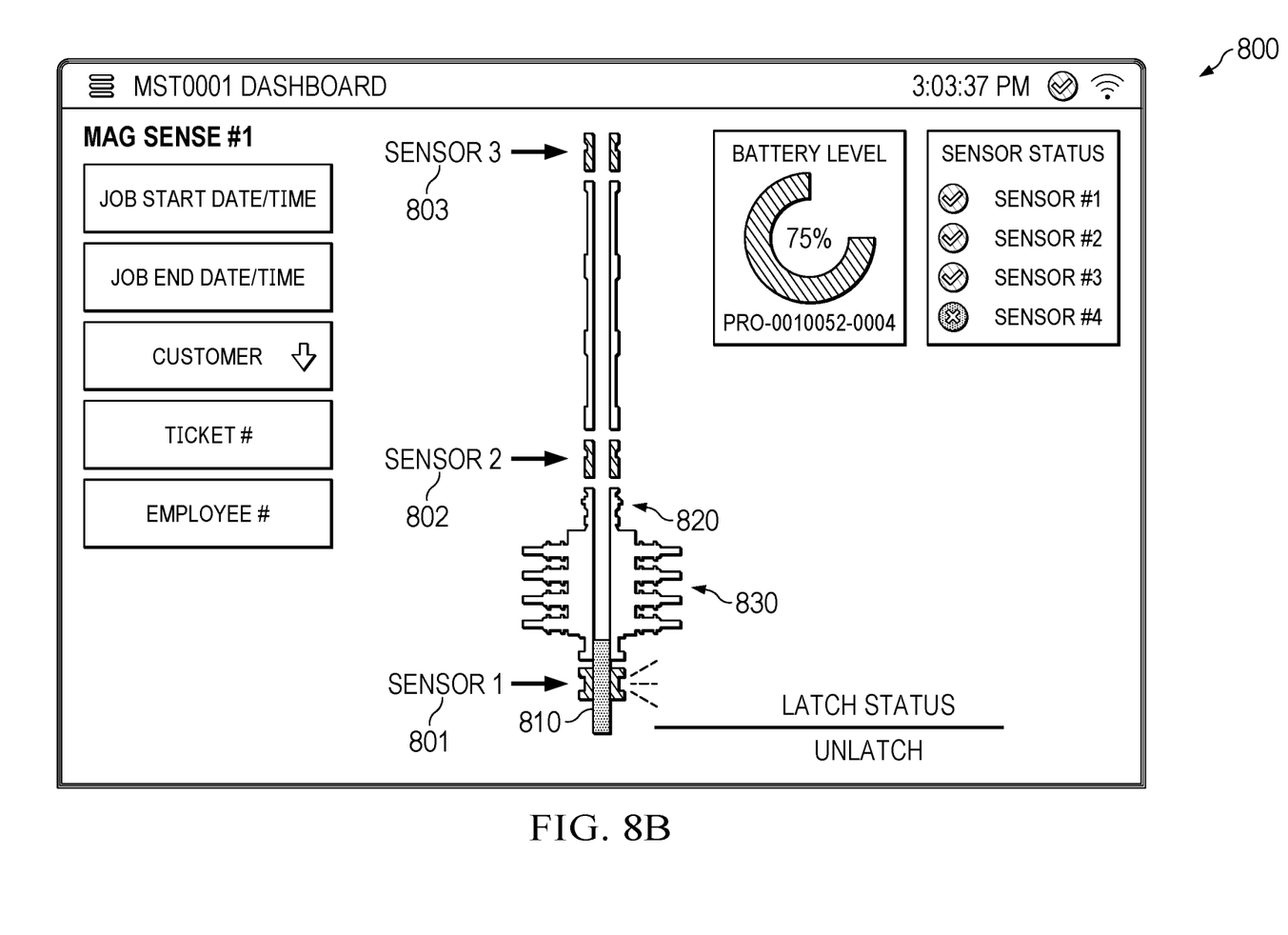
Figure 8C:
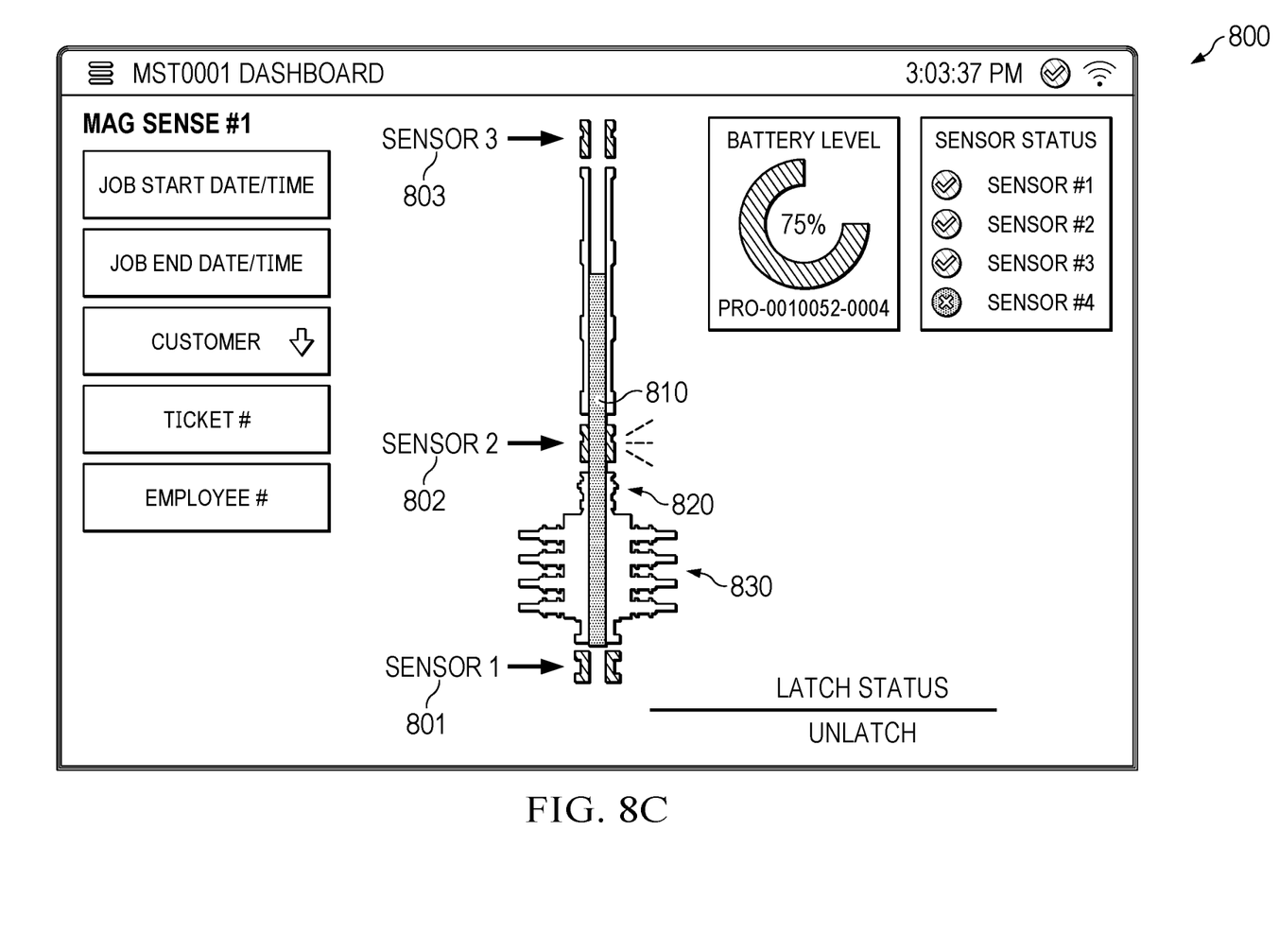
Figure 8D:
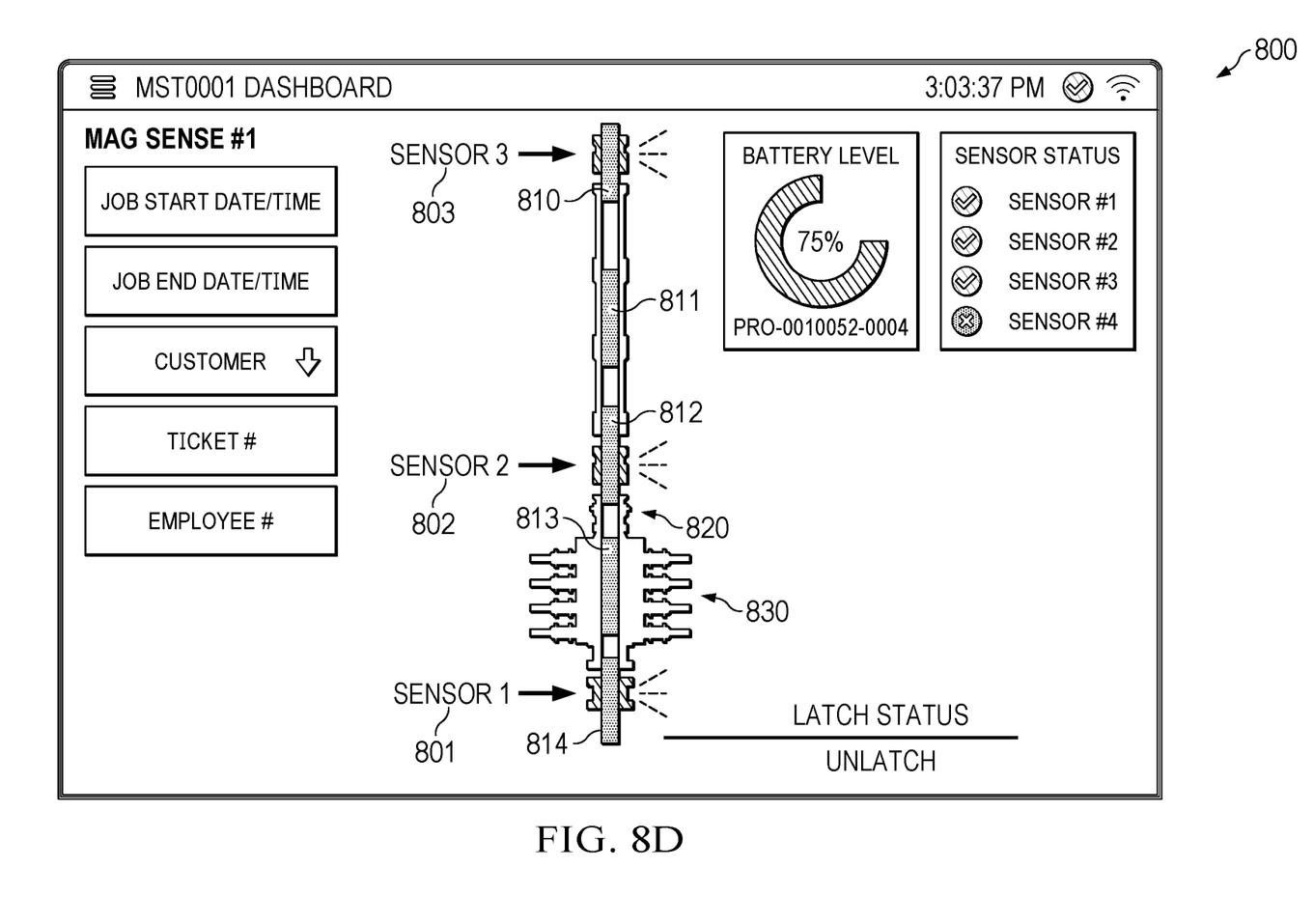

FIGS. 8A-D are depictions of an MST system 800 in various alert stages based on an example control system dashboard which may be one embodiment of the present invention. Referring to FIG. 8A, there are no alerts in the system being triggered and target tool 810 is not in an area that will trigger any of the MST devices. In FIG. 8B, there is a single alert being triggered at sensor 1 at 801 by the target tool 810. In FIG. 8C, there is a single alert being triggered at sensor 2 at 802 by the target tool 810, which extends through both tool trap 820 and wireline valve 830. As can be appreciated by one of skill in the art, a longer target tool such as in FIG. 8C may cause the target tool 810 to trigger multiple sensors at a time. And at FIG. 8D there are multiple alerts being triggered at sensors 1-3 at 801-803, showing multiple target tools 810-814 have been moved into position in the pressure control assembly.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "si de-to-si de," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A magnetic sensing tool ("MST") for detecting the approximate axial location of a target tool having an outer diameter, comprising:

a generally cylindrical housing comprising a central longitudinal axis and an inner diameter greater than the outer diameter of the target tool; and
a plurality of coils disposed about the housing, comprising:
  an upper receiver coil;
  a lower receiver coil;
  a central transmitter coil connected to a power source configured to generate a voltage in the transmitter coil; and
a sensor configured to measure the voltage within each of the plurality of coils;
wherein the plurality of coils are configured such that:
  when there is no target tool disposed within the housing, a first baseline voltage is induced in the upper receiver coil and a second baseline voltage is induced in the lower receiver coil; and
  the presence of a target tool within the housing causes the induced voltage in at least one of the upper and lower receiving coils to decrease from the baseline voltage.

2. The MST of claim 1, wherein the first baseline voltage is greater than the second baseline voltage.

3. The MST of claim 1, wherein the first baseline voltage is less than the second baseline voltage.

4. A method for detecting the axial position of a target tool having an outer diameter, comprising:
installing on a surface pressure control assembly a magnetic sensing tool comprising;
  a generally cylindrical housing comprising a central longitudinal axis and an inner diameter greater than the outer diameter of the target tool; and
  a plurality of coils disposed about the housing, comprising:
    an upper receiver coil;
    a lower receiver coil; and
    a central transmitter coil connected to a power source configured to generate a voltage in the transmitter coil;
providing electrical current to the central transmitter coil;
lowering the target tool into the surface pressure control assembly, such that the target tool axially passes through the housing; and
measuring a differential between a first voltage induced in the upper receiver coil and a second voltage induced in the lower receiver coil.

5. The method of claim 4, wherein the first voltage is greater than the second voltage.

6. The method of claim 4, wherein the first voltage is less than the second voltage.

7. A magnetic sensing tool (MST) system comprising:
a surface pressure control assembly;
a plurality of MSTs disposed within the surface pressure control assembly, each MST comprising:
  a generally cylindrical housing comprising a central longitudinal axis and an inner diameter larger than an outer diameter of a target tool; and
  a plurality of coils disposed about the housing, comprising:
    an upper receiver coil;
    a lower receiver coil;
    a central transmitter coil connected to a power source configured to generate a voltage in the transmitter coil; and
  a sensor configured to measure the voltage within each of the plurality of coils;
  wherein the plurality of coils are configured such that:
    when there is no target tool disposed within the housing, a first baseline voltage is induced in the upper receiver coil and a second baseline voltage is induced in the lower receiver coil; and
    the presence of a target tool within the housing causes the induced voltage in at least one of the upper and lower receiving coils to decrease from the baseline voltage; and
a control terminal configured to receive and process voltage information from the sensor.

8. The MST system of claim 7, wherein the first baseline voltage is greater than the second baseline voltage.

9. The MST system of claim 7, wherein the first baseline voltage is less than the second baseline voltage.

\* \* \* \* \*